(12) United States Patent
Bodkin, Sr.

(10) Patent No.: US 7,944,364 B1
(45) Date of Patent: May 17, 2011

(54) PROTECTED POWER CORD

(76) Inventor: Lawrence Edward Bodkin, Sr., Jacksonville, FL (US)

(*) Notice: Subject to any disclaimer, the term of this patent is extended or adjusted under 35 U.S.C. 154(b) by 0 days.

(21) Appl. No.: 12/807,346

(22) Filed: Sep. 1, 2010

(51) Int. Cl.
*G08B 21/00* (2006.01)
(52) U.S. Cl. ............... 340/644; 340/636.13; 340/825.23
(58) Field of Classification Search .................. 340/644, 340/649–654, 656, 638, 636.13, 647, 664, 340/680, 825.23
See application file for complete search history.

(56) References Cited

U.S. PATENT DOCUMENTS 5,102,345 A * 4/1992 Stanwick et al. ............. 439/181
5,198,955 A * 3/1993 Willner ............................ 361/42
5,642,248 A * 6/1997 Campolo et al. ................. 361/42
7,359,167 B2 * 4/2008 Elms ............................... 361/42

* cited by examiner

*Primary Examiner* — Daniel Previl

(57) ABSTRACT

Shielded power and power extension cords are protected from fire and other hazards caused by deterioration which may be due to age and/or excessive heat, or to physical damage which may be caused by kinking or crushing. At least one shield, which may surround multiple conductors or a single conductor is grounded through a fuse and made to function as a sensor in a fault detection circuit that opens the fuse and causes a relay to discontinue cord power transmission when a fault current passes from an ungrounded conductor to the shield. The relay circuit also refuses to fully close its contacts that transfer power to the cable in the event of receptacle wiring error and functions as a buzzer to indicate such an error.

18 Claims, 1 Drawing Sheet

PROTECTED POWER CORD

NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS REFERENCE TO RELATED APPLICATIONS

Not applicable

STATEMENT REGARDING FEDERALLY SPONSORED RESEARCH OR DEVELOPMENT

Not applicable

REFERENCE TO A SEQUENCE LISTING

Not applicable

BACKGROUND OF THE INVENTION

1. Field of the Invention

This invention relates to methods and devices intended to provide protection in electrical power or power extension cords from fire and other hazards associated with cord deterioration which may be caused by age and/or excessive heat, or by physical damage such as may be caused by kinking or crushing.

2. Background Information

Various means have been employed to provide protection against hazards associated with damage to power cord sets included with electrically energized devices and the power extension cords or cables made to extend their length. Devices such as GFCI's (Ground Fault Circuit Interrupters) have provided personnel protection against lethal shock due to a leakage from the ungrounded conductor that may pass through the body to a source of external grounding. Arcing fault detectors can provide some protection against the heat producing faults, which pass current between conductors enclosed by the cord structure that often cause fire, but depend on leakage fault escalation to the level of arcing to make the fault detectable. Incorporation of most protective devices involves an additional cost that tends to keep them from being widely used in a competitive market unless legally mandated.

Conventionally shielded power cords or cables offer a special opportunity for protection. Power cords or extensions have their conductors surrounded by a conductive shield in order to block emission and/or reception of radio frequencies and are primarily used in cords to provide power to high quality audio devices, computers, monitors, scanners and other sensitive equipment that might suffer from RF interference. Frequently employed shielding elements include conductive polymers, metallic foils or braids either singly or in combination. The present invention expands the use of this RF shield to create a protection against the fire hazard effect of low level leakages from the ungrounded conductor, too small to warrant the activation of service breakers, but large enough to cause deterioration of insulative materials, at minimal additional cost. While a grounded neutral and a grounding conductor are also present in the standard cord assembly, they are slender conduction targets in the matter of leakage due to damage. The greater area of the encompassing shield is readily available and offers a far more immediate pathway to ground, in the event of cord damage. However, the invention also calls for individualized shielding of the conductors for use with the conventional outer shield or without it, according to desired effect.

PRIOR ART

The principles employed in the detection and audible indication of wiring error in a receptacle are those employed by this inventor in his U.S. Pat. No. 4,843,514 entitled "Electrical Connection Sentry System", issued Jun. 27, 1989.

BRIEF SUMMARY OF THE INVENTION

The applicant's invention is multifunctional and efficient despite the simplicity of circuitry and few components. It also has a minimal cost to encourage widespread use.

A sensitive DPST power relay (or DPDT used as a DPST) employed to control power to the cord conductors, three rectifiers (rectifier diodes), a low current capacity fuse, a shield that shields all conductors, and/or a shield that shields one conductor are the only functioning components required in this unique power control circuitry.

OBJECTIVE AND ADVANTAGES

An object of this invention is to provide a simple, positive protection in a shielded power cord against the hazards of internal leakage of a magnitude large enough to cause fire or to create heat that furthers deterioration of insulative materials that will escalate deterioration, increase leakage to a level that could cause fire.

A secondary object of the invention is to continue any original shield function of blocking radio frequency.

Another object of the invention is to use the conventional shields that surround multiple conductors in readily available shielded power cords and/or unconventional individual shields that surround single conductors, as sensors to receive such fault current leakages and cause the disconnection of power transmission from the source to the cord.

Still another object of this invention is to cause a relay to interrupt power to the cord conductors when the fault current leakage, passed from the ungrounded conductor to a shield, reaches a predetermined level.

Another associated object is to provide this protection at the least possible cost in order to encourage widespread usage.

Still another associated object is to provide protection that is automatic so that no operator attention is required.

Yet another object is to provide protection that includes a warning indication of wiring errors and prevents usage if the cord's plug is inserted into a miswired receptacle.

Figure 1:
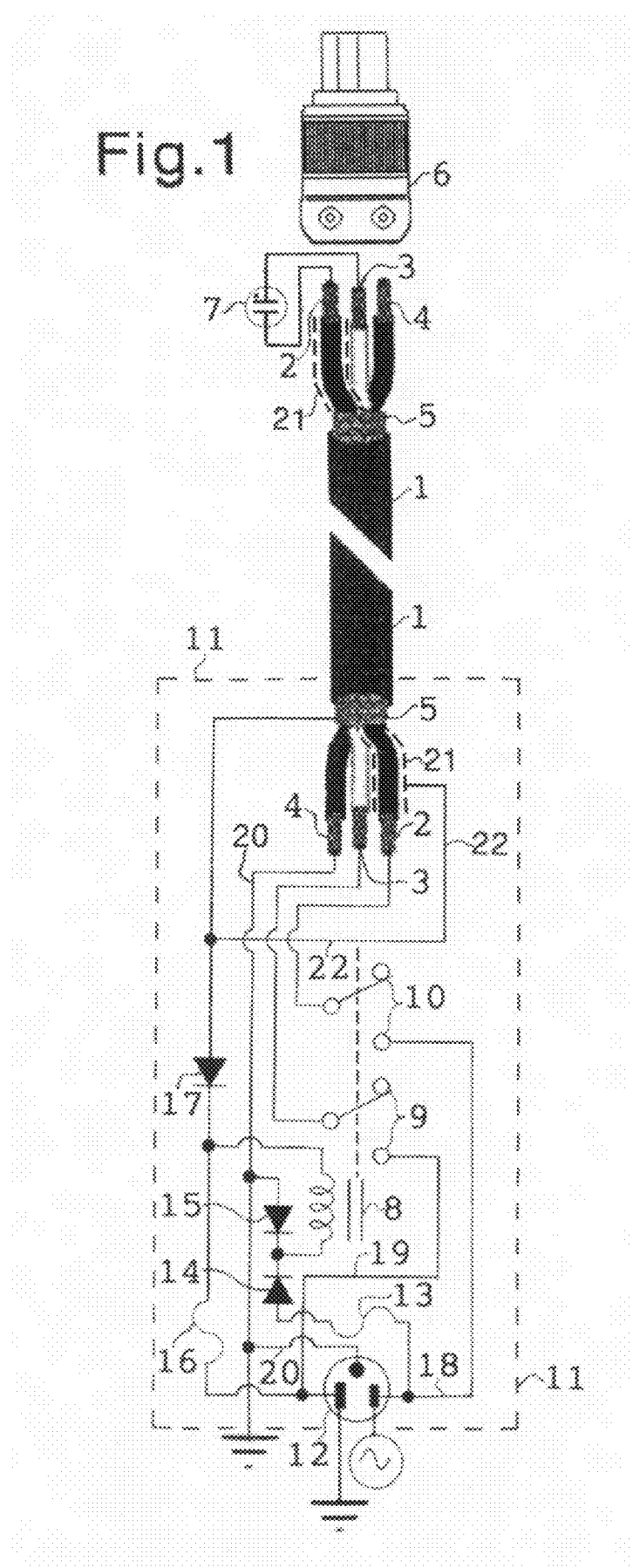
FIG. 1 depicts an embodiment of the invention in its entirety, in a schematic showing connection to a commercially available power cord shielded by a metallic braid that encompasses its conductors, and is equipped with an IEC plug commonly used to connect the cord to electrically powered devices, which may be sensitive to RF interference, such as computers, monitors, scanners, computer controlled printers and audio equipment.

Also shown, as a part of the invention, is an individual conductive shielding that surrounds the ungrounded conductor.

DETAILED DESCRIPTION OF A PREFERRED EMBODIMENT

The relay used in the applicant's invention has a coil, core and armature combination that is designed to be fully energized and perform its power switching function only when supplied with full-wave alternating current. However, such a relay can perform as though fully energized when supplied with the half-wave of alternating current passing through one rectifier when a second rectifier is used to provide a path for the current generated by the collapse of the magnetic field of coil and core between pulses. This path may be made by directly connecting one side of the coil to the other, through the second rectifier, but the path may also be made to include the grounded neutral conductor and grounding conductor. Arranging the path to include these conductors enables the circuit to indicate the presence of wiring errors in a receptacle by not performing as though fully energized, not fully closing its normally open contacts, and acting only as a buzzer. Such wiring errors include omission of a grounding connection and reversal of the ungrounded and grounded neutral connections.

Most relays with coil, core and armature combinations designed for use with alternating current are suitable for use in this circuit. An example by idec is marked "RH-2B-U". However, some relays with coils labeled for alternating current use cannot be used in this circuit to detect and indicate receptacle wiring errors due to the fact that they are capable of being fully functional when their coils are powered by half-wave, pulsating direct current, such as that provided through the one rectifier. They do not require the path provided through the said second rectifier to function as though fully energized. An example of this type is by Aromat, labeled HC2-H-AC115V.

In FIG. 1, The insulating outer sleeve of power cord 1 is shown to contain three conventional conductors; an ungrounded "hot" conductor 2, a grounded neutral conductor 3, and a grounding conductor 4, plus a conventional braided metal conductive shield 5, that surrounds conductors 2, 3 and 4. A second conductive shield 21 is also shown that unconventionally surrounds only ungrounded conductor 2 for its length as enclosed within cord 1. Shields 5 and 21 can be made of many alternative conductive materials. Shield 21, although shielding a power conductor, could provide shielding in much the same fashion as the shield of a coaxial cable, and be individually sheathed in a similar manner by a conductive braid or conductive foil which are often used to form 5. Conductor 2 could also have the outer surface of its standard insulation metallized to provide a shield.

The IEC plug 6, commonly used to provide a power connection to computers, printers, monitors, scanners and other electronics based devices, may be replaced by a conventional power socket for supplying plug-in power to simpler electrical devices such as tools or appliances. As a line cord, the conductors may be continued into the housings of electrically powered devices and be internally connected.

The indicator lamp 7 is not part of the protective circuit but is included to indicate when the cord is ready to furnish power. In a preferred embodiment, it is enclosed within a transparent or translucent plug or socket body.

The relay, comprising coil, core and armature combination 8 and contact pairs 9 and 10 is contained, together with the control circuit, within enclosure 11 to which three pronged or bladed plug 12 is attached or made integral. Plug 12 is made for insertion into a grounding receptacle.

Normally open relay contact pair 9 closes to connect the grounded neutral side of the source from plug 12 to cord conductor 3 through lead 19 and normally open contact pair 10 closes to connect the ungrounded side of the source from plug 12 to cord conductor 2 through lead 18, when the coil, core and armature combination of the relay permit performance as though fully energized.

Half-wave alternating current as pulsating direct current is supplied to the coil of the coil, core and armature combination 8, through fuse 13 and rectifier diode 14. Rectifier diode 15 connects the same side of the coil of the said combination to the grounding connection 20 and back to the other side of the coil which is grounded through low current capacity fuse 16 to the grounded neutral side of the source from plug 12. This is a path for the collapsing field of coil and core combination 8 can be made through fuse 16, its connection to the grounded neutral conductor and through the grounding conductor 20 because they are joined at the service. Completion of the path causes the relay to perform as though fully energized by a full-wave alternating current.

When the grounding connection is omitted or rendered non-functional in a receptacle into which plug 12 is inserted and the path is therefore not completed, the relay coil and core combination cannot cause the relay to perform as though fully energized but does cause it to function as a buzzer to indicate the absence of a grounding connection.

If the receptacle is wired incorrectly and the ungrounded and grounded neutral connections are reversed, the relay coil, core and armature combination cannot permit the relay to perform as though fully energized and thereby fully close its contacts. The pulsating direct current of the half-wave alternating current acting alone causes it to function as a buzzer to indicate this wiring error.

The conductive shield 5 is connected through rectifier diode 17 to the grounded neutral lead from plug 12 through the same low current carrying capacity fuse 16 that is used to connect the coil of the coil, core and armature combination 8 to the said grounded neutral lead. Rectifier diode 17 is used to block energizing of shield 5 and/or 21 by the coil energizing circuit when fuse 16 is opened. Shield 21 is connected to fuse 16 in parallel with shield 5 by lead 22.

If current is passed from ungrounded cord conductor 2, to the conductive shield 5 or shield 21, it is passed through diode 17 and low current carrying capacity fuse 16 to the grounded neutral lead from plug 12. This is the same fuse that carries current from the coil of the coil, core and armature combination 8 to the grounded neutral connection. When current from the shield exceeds the current carrying capacity of fuse 16, the fuse opens, the coil and core combination are no longer energized, contact pairs 9 and 10 are returned to their open state and power to conductors 2 and 3 of cord 1 is discontinued.

Due to the ability of the circuit to identify receptacle wiring errors, and its refusal to function properly if connected to a reverse wired receptacle, a functioning power cord can provide a positive assurance that its ungrounded conductor 2, grounded neutral conductor 3, and grounding conductor 4, are correctly connected to the power source by plug 12.

In regard to the above mentioned connection assurances, regulations may be modified to permit breaking only the ungrounded "hot" side of the line by a simple SPST relay or a SPDT relay used as a SPST type. Full protection, from hazardous current leakage would be provided by closing and opening contact pair 10. Grounded neutral conductor could be directly connected and contact pair 9 could be omitted. One SPDT relay of this type, by idec, is labeled RHIB-U.

If shield 21 is to be used, shield 5 may be optionally disconnected, or directly connected to the grounded neutral conductor or the grounding conductor 20 to omit connection through rectifier 17 and fuse 16 and restore its simple shielding function. If shield 5 is not included in a power cord, and RF shielding is desired, conductor 3 and 4 should also be provided with an individual shielding as shown for conductor 2 and grounded in parallel with 21.

In prototypes, fuse 16 was rated at 100 ma. While this provides an acceptable level of protection, relay current requirements may be reduced and fuses of particularly small current carrying capacity may be specially made so that the circuit can be made even more sensitive in its reaction to fault current. This fuse should not be made replaceable, since a leakage fault current large enough to open the fuse would be evidence of severe damage and use of the power cord should be discontinued. If made replaceable, there is always the possibility that a user may substitute a larger capacity fuse that will permit continued use regardless of hazard.

It should be noted that the functioning of the relay control circuit will not be affected if all diodes are simultaneously reversed from the polarity which is shown.

Fuse 13 may be considered optional in that it has no function in the protective circuit other than to protect against opening a service breaker in the event of a conductive failure of either rectifier diode 14 or 15 which would pass half-wave current directly from the ungrounded to the grounded neutral conductors from plug 12. If used, fuse 13 should have a substantially greater current carrying capacity than fuse 16.

While the invention has been described with respect to certain specific embodiments, it will be appreciated that many modifications and changes may be made by those skilled in the art without departing from the true spirit of the invention. It is intended therefore, by the appended claims, to cover all such modifications and changes as fall within the true spirit and scope of the invention.

What is claimed as new and what is desired to secure by Letters Patent of the United States is:

1. In an electrical power cord having multiple conductors including an ungrounded and a grounded neutral conductor; the improvement comprising;
   at least one conductive shield, connected to said grounded neutral conductor through a fuse of low current carrying capacity and shielding at least one of the said conductors;
   said conductors being connected to an electrical power source by a relay when energized by a control circuit, connected to said ungrounded conductor and to said grounded neutral conductor through the same fuse of low current carrying capacity;
   said fuse being opened by a leakage current exceeding a predetermined level and passing from the ungrounded conductor through the said at least one conductive shield and said fuse, interrupting the relay energizing circuit and causing said relay to disconnect said power cord conductors from the power source to provide protection from fire and other hazards associated with cord deterioration and damage.

2. The improvement as defined in claim 1, wherein said relay has current switching contacts and a coil, core and armature combination designed to fully close said contacts and connect said source to said conductors only when fully energized by an alternating current source; but made to perform as though fully energized, when one side of said relay coil receives half-wave, pulsating direct current through a first rectifier from an ungrounded conductor and the other side of said coil is connected to a grounded neutral conductor from said alternating current source when a second rectifier is connected from the grounding conductor to the ungrounded side of said coil to complete a pathway for current generated by the collapse of the magnetic field of said coil and core combination between the pulses of said pulsating direct current.

3. The improvement as defined in claim 2, in which said pathway is not completed if the grounding conductor is absent or non-functional causing the relay to perform as less than fully energized, to fail to fully close its contacts and to function as a buzzer to indicate the wiring error.

4. The improvement as defined in claim 2, wherein said pathway is made incomplete when the connections of the ungrounded and grounded neutral conductors are reversed by a miswiring of a receptacle from which power from said source is to be obtained, causing the relay to function as though less than fully energized, to fail to fully close its contacts and to function as a buzzer to indicate the wiring error.

5. The improvement as defined in claim 1, wherein the said fuse has a current carrying capacity only slightly greater than that required to reliably carry the current required to cause the relay to continuously perform as though fully energized.

6. The improvement as defined in claim 1, wherein the said fuse is rated at a current carrying capacity no greater than 100 milliamperes.

7. In a power cord assembly, having multiple conductors made to convey electrical power from an alternating current source to electrically powered devices;
   the improvement comprising;
   a relay
   having a coil, core and armature combination;
   and having contacts made to close and connect said conductors to said source only when performing as fully energized by alternating current;
   having a relay energizing circuit connecting the coil of said relay to an ungrounded side of said source and to a grounded neutral side of said source through a fuse of low current carrying capacity;
   and having at least one conductive shield that shields at least one said conductor, connected to the said grounded neutral side of said source through the same said fuse; making a fault current exceeding the capacity of said fuse and reaching said shield from an ungrounded conductor due to cord damage or deterioration, pass through and open said fuse, interrupting the relay energizing circuit and causing the relay to disconnect said power cord conductors from said source, to provide protection from hazards associated with cord damage or deterioration.

8. The improvement as defined in claim 7, wherein said relay is made to function as though fully energized, when receiving half-wave, pulsating direct current through a first rectifier from an ungrounded conductor and connection to a grounded neutral conductor when a second rectifier is connected from the grounding conductor to the ungrounded side of said coil to complete a pathway for current generated by the collapse of the magnetic field of said coil and core combination between the pulses of said pulsating direct current.

9. The improvement as defined in claim 8, in which said pathway is not completed if the grounding conductor is absent or non-functional, causing the relay not to function as fully energized, not fully closing its contacts and functioning as a buzzer to indicate the error.

10. The improvement as defined in claim 8, wherein said pathway is made incomplete when the connections of the ungrounded and grounded neutral are reversed by a miswiring of a receptacle from which power from said source is to be obtained, causing the relay to perform as though less than fully energized, to fail to fully close its contacts and to function as a buzzer to indicate the wiring error.

11. The improvement as defined in claim 7, wherein the said fuse has a current carrying capacity only slightly greater than that required to reliably carry the current required to cause the relay to continuously perform as though fully energized.

12. The improvement as defined in claim 7, wherein the said fuse is rated at a current carrying capacity no greater than 100 milliamperes.

13. In an electrical power cord assembly, having a power plug termination on one end made for insertion into a receptacle supplying alternating current power from its source and having conductors to connect said plug termination to a socket termination, on the other end, making said electrical power available to electrically powered devices;
the improvement comprising;
a relay with a coil, core, armature and normally open contacts made to fully close and connect said conductors to said source through said plug and receptacle only when the relay is performing as, fully energized;
having an energizing circuit connecting said coil to the ungrounded side of said source through a rectifier and to the grounded neutral side of said source through a fuse of low current carrying capacity;
having at least one conductive shield surrounding at least one of said conductors;
connected to the grounded neutral side of said source through the same fuse, making a fault current reaching said shield due to cord damage or deterioration pass through said fuse, open said fuse, when said fault current exceeds the current carrying capacity of said fuse, cause the relay energizing circuit to be interrupted, the relay to be de-energized, the relay contacts to be opened and power from said source to said power cord conductors to be disconnected, providing protection from fire and other hazards associated with cord deterioration and damage.

14. The improvement as defined in claim 13, in which said relay is made to function as though fully energized, when its coil is receiving half-wave, pulsating direct current through the said rectifier from an ungrounded conductor on one side and connected to a grounded neutral conductor through said fuse on the other side to complete connection to said alternating current source when a second rectifier is connected from the grounding conductor to the ungrounded side of said coil to complete a pathway for current generated by the collapse of the magnetic field of said coil and core combination between the pulses of said pulsating direct current.

15. The improvement as defined in claim 14, in which said pathway is not completed if the grounding conductor is absent or non-functional causing the relay to perform as less than fully energized, to fail to fully close its contacts and to function as a buzzer to indicate the wiring error.

16. The improvement as defined in claim 14, wherein said pathway is made incomplete when the connections of the ungrounded and grounded neutral are reversed by a miswiring of a receptacle from which power from said source is to be obtained, causing the relay to perform as though less than fully energized, to fail to fully close its contacts and to function as a buzzer to indicate the wiring error.

17. The improvement as defined in claim 13, wherein the said fuse has a current carrying capacity only slightly greater than that required to reliably carry the current required to cause the relay to continuously perform as though fully energized.

18. The improvement as defined in claim 13, wherein the said fuse is rated at a current carrying capacity no greater than 100 milliamperes.

* * * * *